Dec. 31, 1946.   A. J. EVERS   2,413,553
SHEET CUTTING AND CREASING PRESS
Filed Nov. 4, 1943   14 Sheets-Sheet 1

INVENTOR.
Arthur J. Evers.
BY
attorneys.

Dec. 31, 1946.        A. J. EVERS        2,413,553
SHEET CUTTING AND CREASING PRESS
Filed Nov. 4, 1943        14 Sheets-Sheet 2

INVENTOR.
Arthur J. Evers
BY

Dec. 31, 1946.   A. J. EVERS   2,413,553
SHEET CUTTING AND CREASING PRESS
Filed Nov. 4, 1943   14 Sheets-Sheet 4

INVENTOR.

Dec. 31, 1946.  A. J. EVERS  2,413,553
SHEET CUTTING AND CREASING PRESS
Filed Nov. 4, 1943   14 Sheets-Sheet 7

INVENTOR.
Arthur J. Evers
BY
attorneys

Dec. 31, 1946.　　　　A. J. EVERS　　　　2,413,553
SHEET CUTTING AND CREASING PRESS
Filed Nov. 4, 1943　　　14 Sheets-Sheet 9

INVENTOR.
Arthur J. Evers
BY
attorneys

Dec. 31, 1946.   A. J. EVERS   2,413,553
SHEET CUTTING AND CREASING PRESS
Filed Nov. 4, 1943   14 Sheets-Sheet 11

INVENTOR.
Arthur J. Evers
BY

Dec. 31, 1946.  A. J. EVERS  2,413,553

SHEET CUTTING AND CREASING PRESS

Filed Nov. 4, 1943  14 Sheets-Sheet 12

INVENTOR.

Patented Dec. 31, 1946

2,413,553

UNITED STATES PATENT OFFICE 2,413,553

SHEET CUTTING AND CREASING PRESS

Arthur J. Evers, Brooklyn, N. Y., ass'gnor to C. B. Cottrell & Sons Company, Westerly, R. I., a corporation of Delaware Application November 4, 1943, Serial No. 508,905

19 Claims. (Cl. 164—21)

This invention is directed to novel means for and method of cutting and creasing sheets, as, for instance, folding box blanks.

One object of my invention is to provide certain improvements in sheet cutting and creasing presses of the coacting platen type whereby the presses may be driven at a relatively high speed with a minimum movement of the various working elements and thus materially increasing production by the presses.

Another object of my invention is to provide a sheet cutting and creasing press in which the sheet handling carriage is reciprocated and arranged for simultaneously feeding, on one stroke of the carriage, a new sheet into the press and delivering the preceding cut and creased sheet therefrom.

My invention comprises a press of the above character in which the stationary lower platen is provided with a sheet cutting and creasing die and the upper movable platen with a cutter plate coacting with said die; the sheet handling carriage which reciprocates between the die and its coacting cutter plate being raised and lowered as it is reciprocated: means, as sheet grippers, being provided on the carriage for feeding a sheet into the press and lowering the sheet on the die; and means, as suction devices being provided on the carriage for lifting the previously cut and creased sheet from the die, conveying it forward and lowering it to a suitable delivery point.

My invention also comprises means for temporarily stopping the carriage at one end of its stroke during the sheet cutting and creasing operation, and means, as stationary suction devices, for holding the sheet on the die during said cutting and creasing operation.

My invention also includes certain other improvements in the construction, arrangement and operation of the several parts of the press as will hereinafter more fully appear.

A practical embodiment of my invention is represented in the accompanying drawings in which.

The press frame comprises generally the base member 1 and the frame members 2 and 3.

The pile of blank sheets at the feed or rear end of the press is denoted by 4 and the pile of cut and creased sheets at the front or delivery end of the press is denoted by 5.

The stationary lower platen 6 of the press carries the cutting die 7 which die is arranged to cut and crease at one operation, blank sheets of various shapes and sizes.

The movable upper platen 8 carries the cutter plate 9 which coacts with the die 7 to cut and crease the blank sheets as they are successively fed into the press. This upper platen 8 is connected to the two lower cross heads 12 by rods 11 slidable in the frame brackets 10.

The weight of this upper platen and its frame is substantially counterbalanced to facilitate the rapid reciprocation of the upper platen into and out of its coaction with the lower platen. In the present instance a plurality of heavy coil springs 13 are located between the base 1 of the press frame and the lower cross heads 12 of the platen frame.

Figure 7:
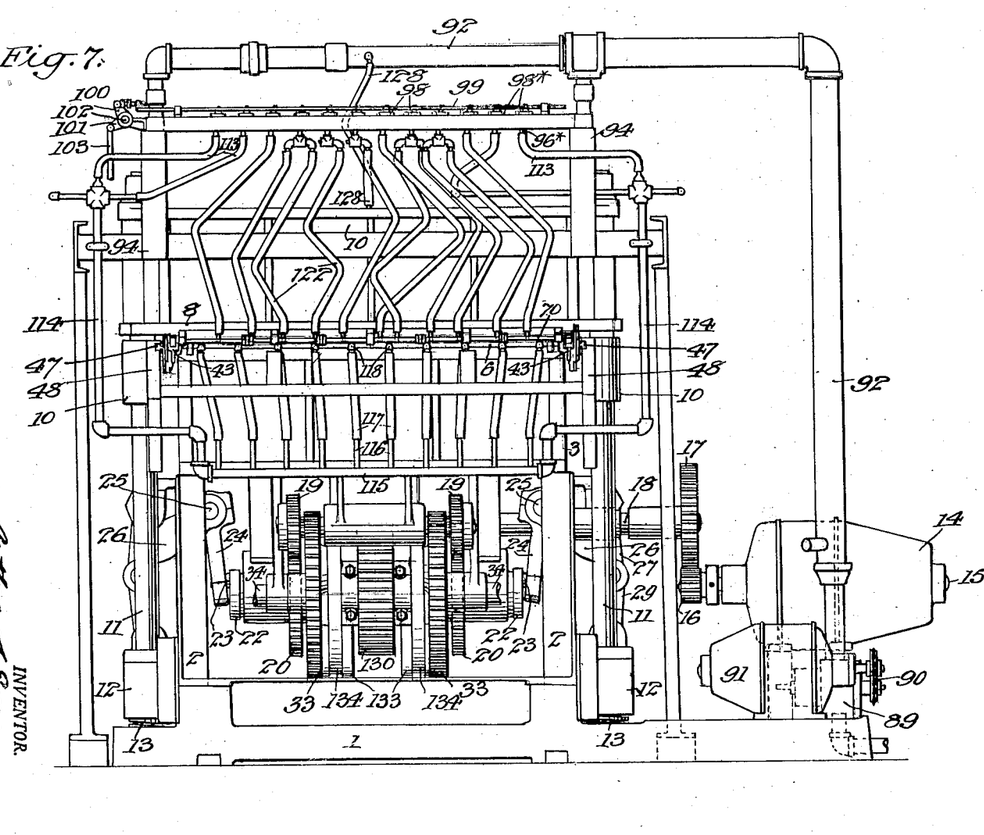
Fig. 7 represents a front elevation at the delivery end of the machine.
Figure 8:
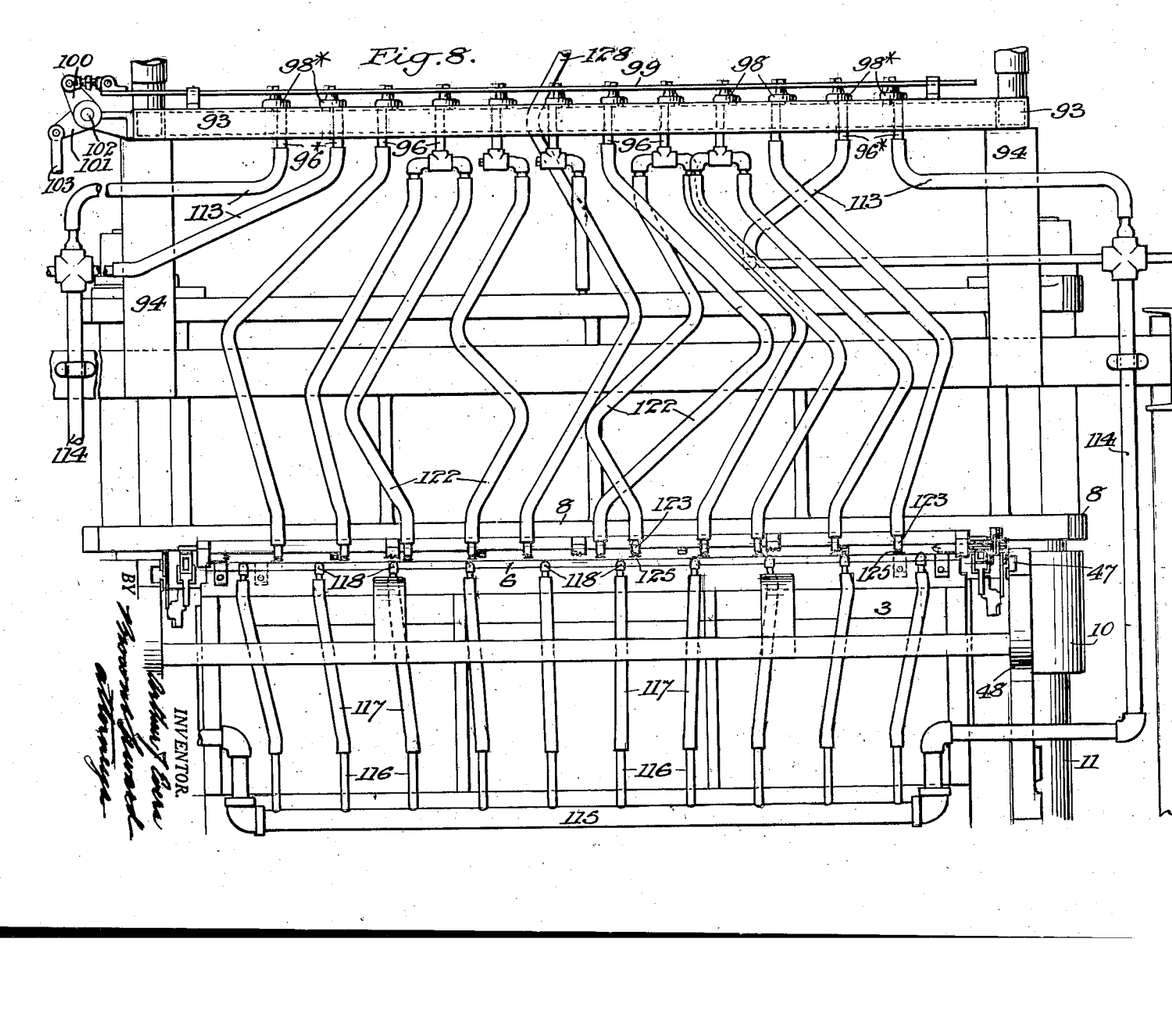
Fig. 8 represents a detail front elevation of the upper portion of the delivery end, on an enlarged scale.
Figure 35:
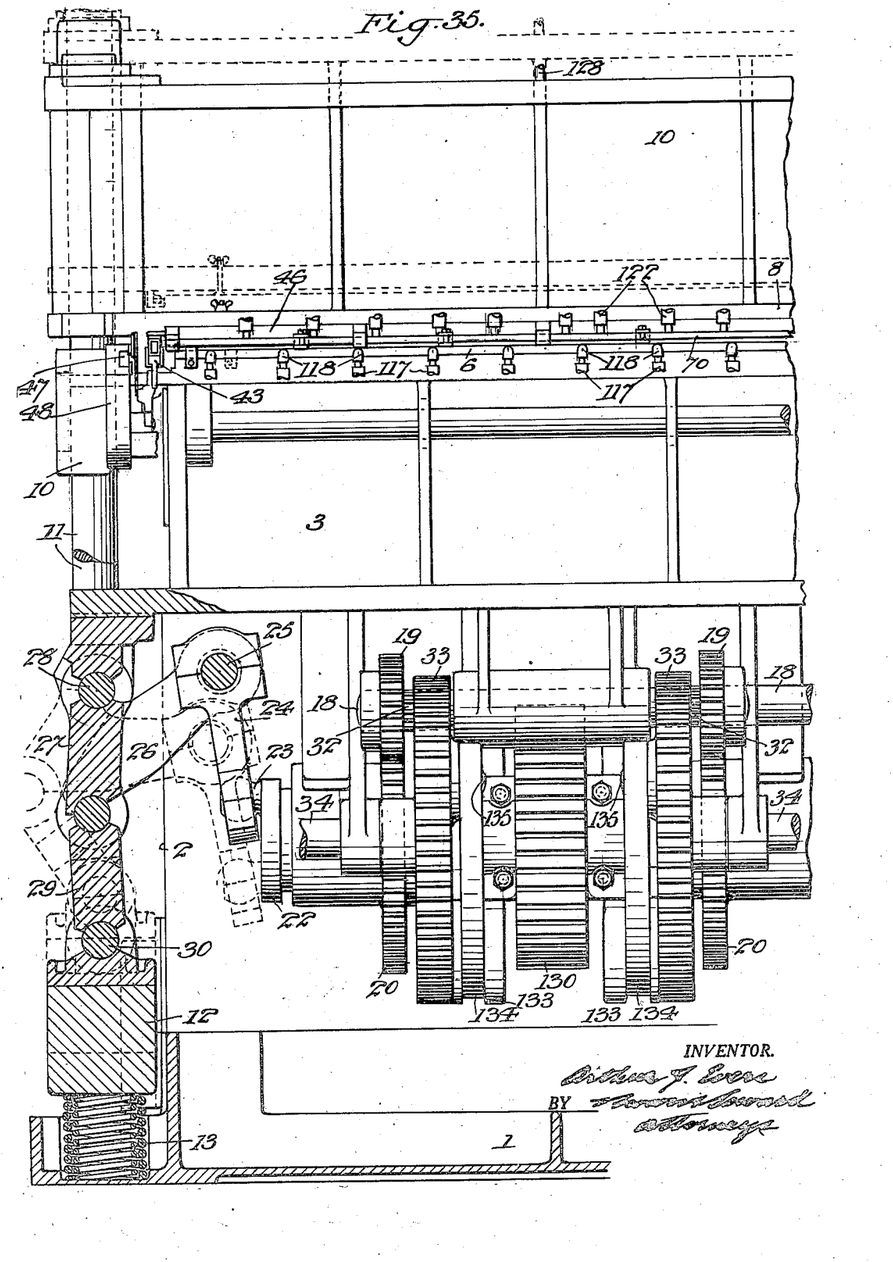
Fig. 35 represents a detail end elevation of a portion of the machine partly in section and on a scale similar to that shown in Figs. 28 to 33 inclusive, and showing the actuating mechanism of the reciprocating platen.

The following means are provided for vertically reciprocating the upper platen 8 at a variable speed so that the platen may be speeded up as it nears its sheet cutting and creasing position and slowed down after it leaves said position, thereby allowing sufficient time for the reciprocation of the sheet handling carriage between the platens. An electric motor 14 (see Fig. 7) has its shaft 15 provided with a gear 16 which meshes with a gear 17 on a cross shaft 18 which is provided with two gears 19 which mesh with their two gears 20 loosely mounted on the crank shaft 21 (see Figs. 36 and 37). This crank shaft 21 is provided with crank discs 22 at its ends. These crank discs are provided with spherical headed pins 23 engaging links 24 pivoted at 25 to arms 26 projecting from the upper members 27 of toggle levers pivoted at 28 to the base frame (see Fig. 35). The lower members 29 of the toggle levers are pivoted at 30 to the lower cross heads 12 of the upper platen 8. The cross shaft 18 is also provided with two gears 32 which mesh with gears 33 on cam shafts 34 (see Fig. 36).

Figure 36:
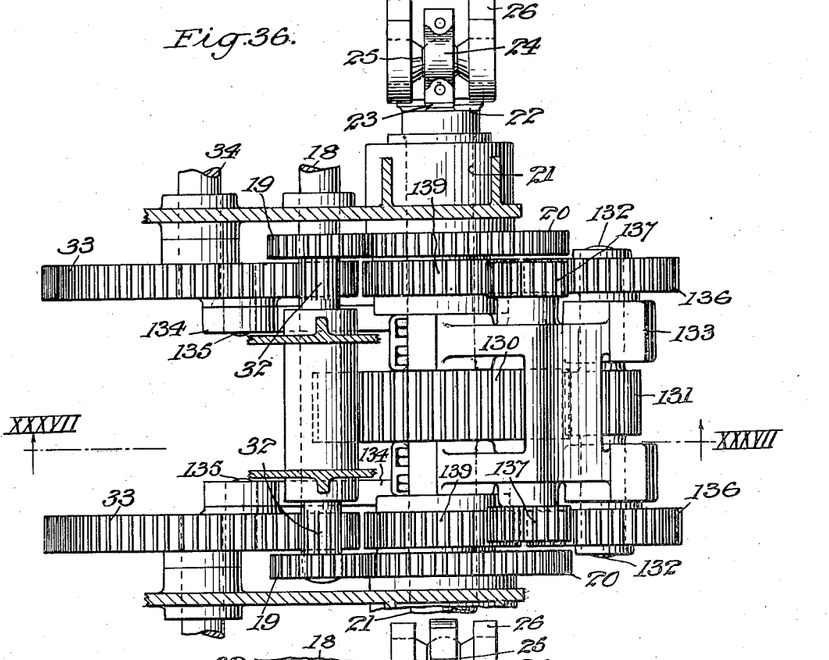
Fig. 36 represents a detail plan view of the gearing and adjacent parts for raising and lowering the upper platen.
Figure 37:
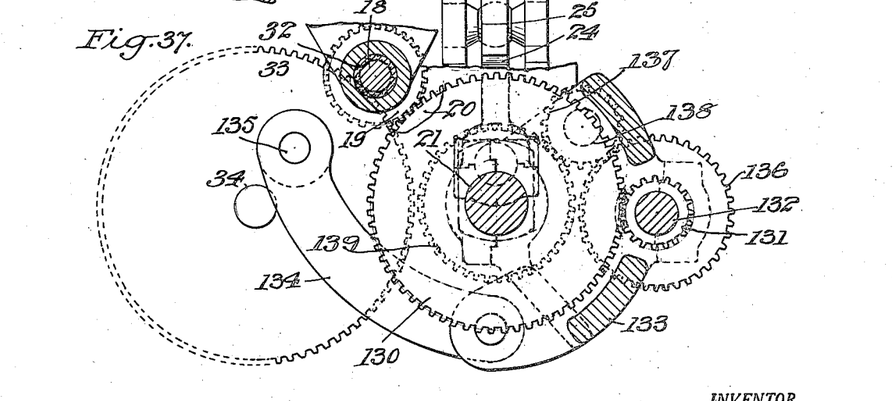
Fig. 37 represents a detail vertical section taken in the plane of the line XXXVII—XXXVII of Fig. 36, looking in the direction of the arrows.

A gear 130 fast on the shaft 21 meshes with a pinion 131 fast on a shaft 132 mounted in a swinging support 133 which is oscillated on the shaft 21 by means of links 134 eccentrically pivoted at 135 on the gears 33. Gears 136 on the shaft 132 mesh with gears 137 carried by the stud shafts 138 on the swinging support 133 which gears 137 mesh with gears 139 loosely mounted on the shaft 21.

Figures 13, 14, 15:
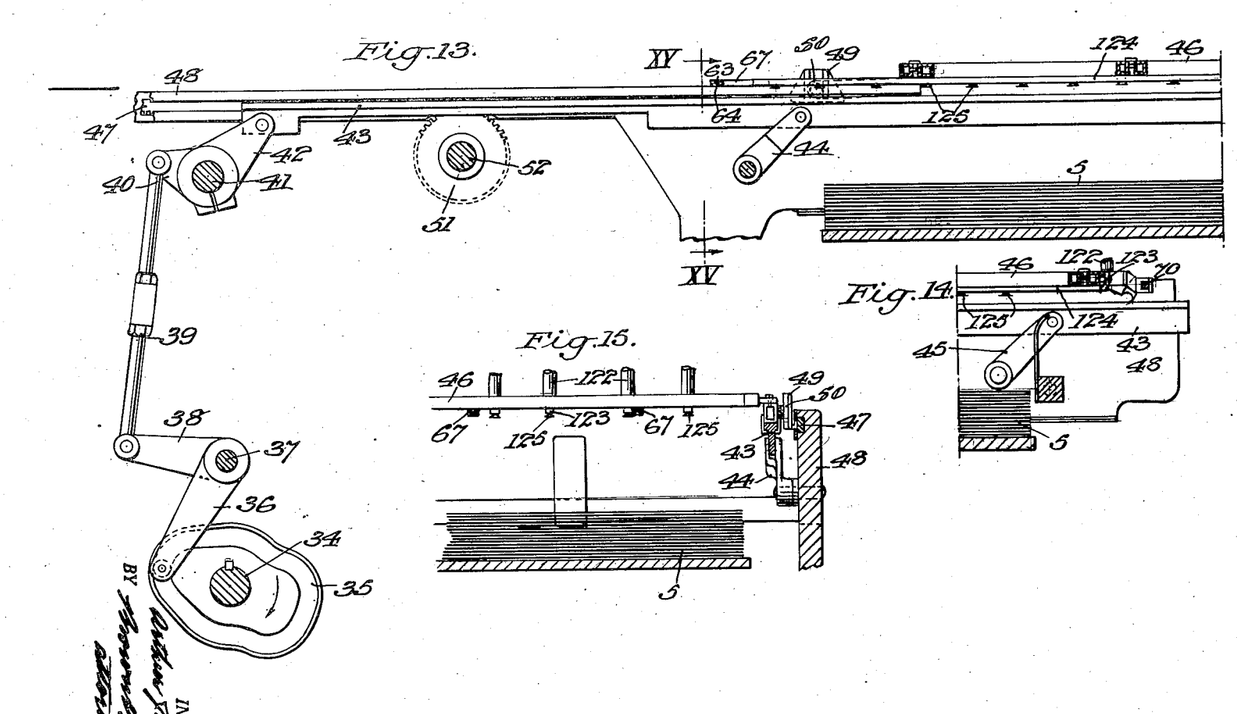
Figs. 13 and 14 represent a detail longitudinal section through the carriage showing the means for raising and lowering the same.
Fig. 15 represents a detail vertical section taken in the plane of the line XV—XV of Fig. 13, looking in the direction of the arrows.

A track is provided for guiding the sheet handling carriage in its reciprocating movement, which track is raised and lowered by the elements connected to the cross shaft 18, as follows:

One of the cam shafts 34 (see Fig. 13) carries a box cam 35 which engages one arm 36 of a rock lever pivoted at 37, the other arm 38 of which rock lever is connected by a link 39 with an arm 40 of a rock shaft 41. The arms 42 of said rock lever are pivoted to their respective side rails 43 of the carriage track. These side rails 43 of the track are also supported at intervals by pairs of rock arms 44 and 45.

Figures 16, 17:
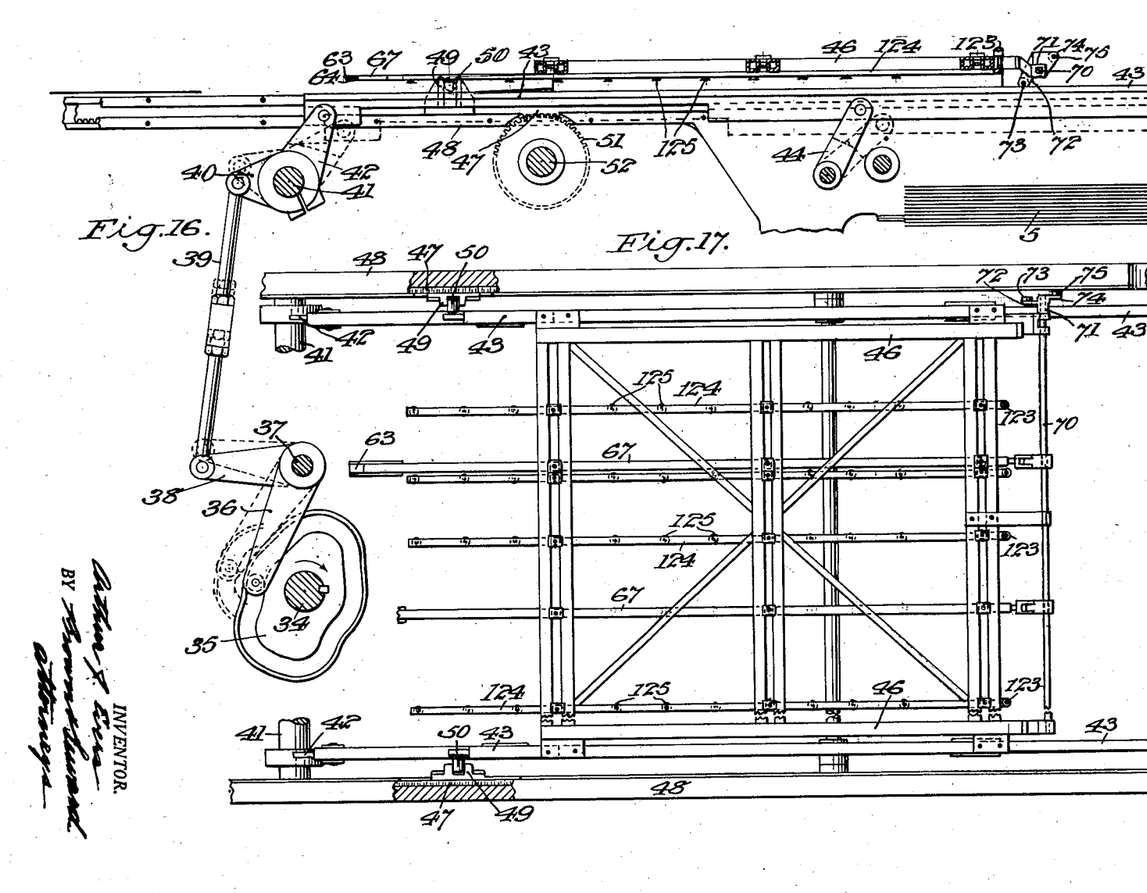
Fig. 16 represents a detail longitudinal section similar to Fig. 13 showing the parts in another position and carriage raised.
Fig. 17 represents a detail plan view of certain of the parts shown in Figs. 13 and 15.
Figure 18:
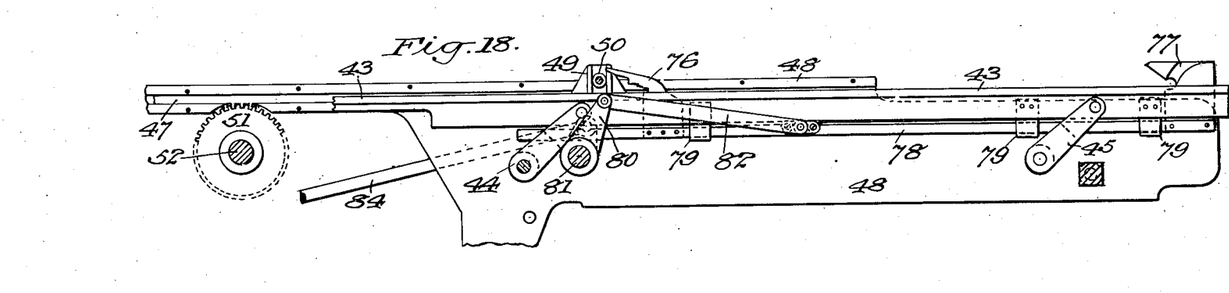
Fig. 18 represents a detail longitudinal section showing the reciprocating means for opening and closing the grippers on the carriage.
Figures 19, 20:
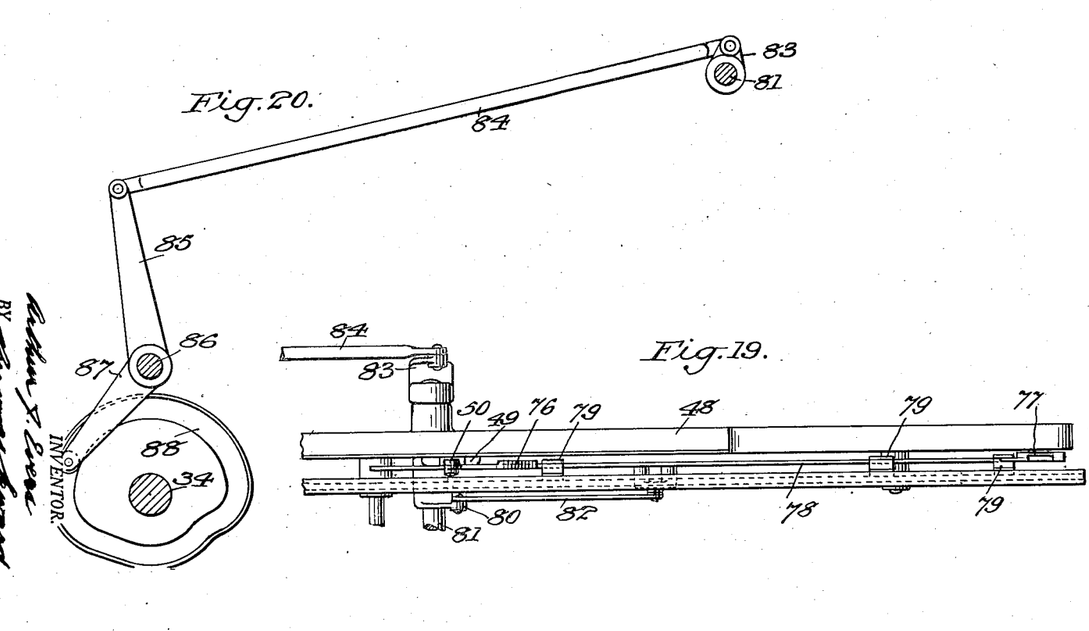
Fig. 19 represents a detail plan view of the same.
Fig. 20 represents a detail section showing the cam, the arm and the rock shaft for actuating the gripper mechanism.
Figures 21, 22:
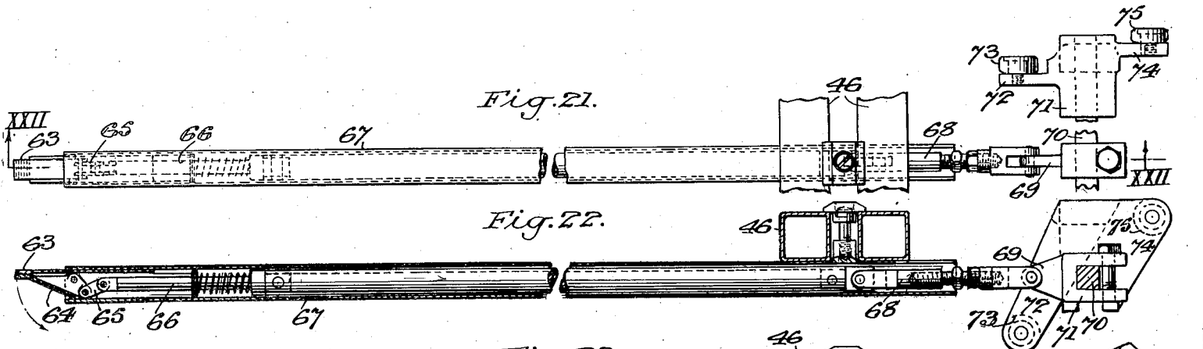
Fig. 21 represents a detail plan view of a gripper and the actuating lever and rollers on a larger scale than the preceding figures.
Fig. 22 represents a longitudinal section taken in the plane of the line XXII—XXII of Fig. 21.
Figures 23, 24, 25, 26, 27:
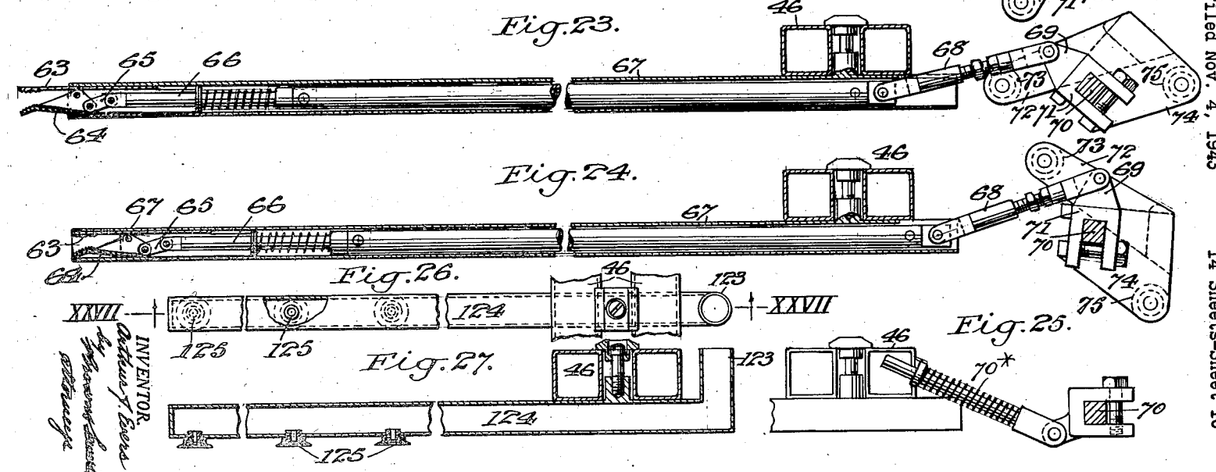
Fig. 23 represents a similar view showing the gripper in its open position.
Fig. 24 represents a similar view showing the gripper retracted.
Fig. 25 represents a vertical section showing the spring means for yieldingly holding the gripper actuating shaft in both of its positions.
Fig. 26 represents a detail plan view partly in section of a portion of the carriage showing the suction devices applied thereto.
Fig. 27 represents a longitudinal section taken in the plane of the line XXVII—XXVII of Fig. 26.
Figures 28, 29, 30:
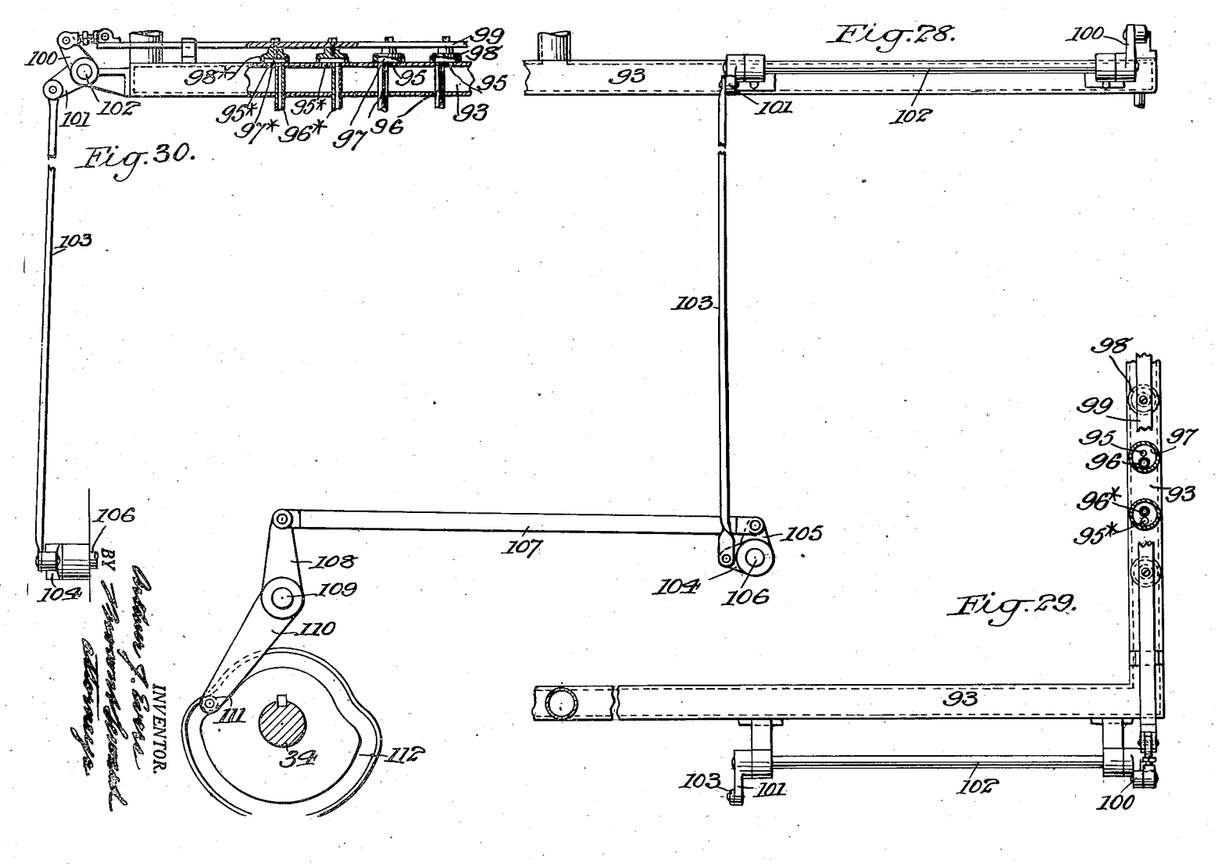
Fig. 28 represents a detail side elevation of the manifold and adjacent mechanism for controlling the actuation of the suction devices, on a scale similar to that shown in Figs. 6 to 20 inclusive.
Fig. 29 represents a detail plan view of the same partly in section.
Fig. 30 represents a detail end view of the same partly in section.
Figure 31:
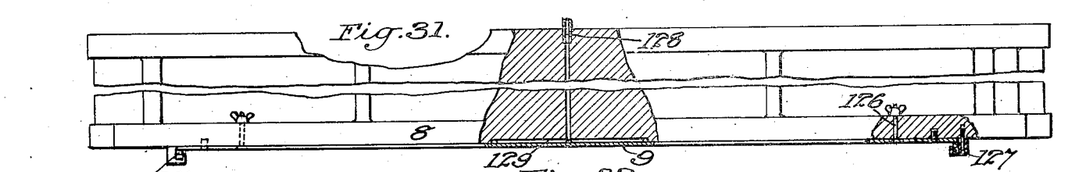
Fig. 31 represents a detail side elevation of the upper reciprocating platen partly in section.
Figure 32:
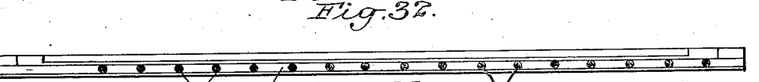
Fig. 32 represents an end elevation of the stationary lower cutting and creasing platen.
Figure 33:
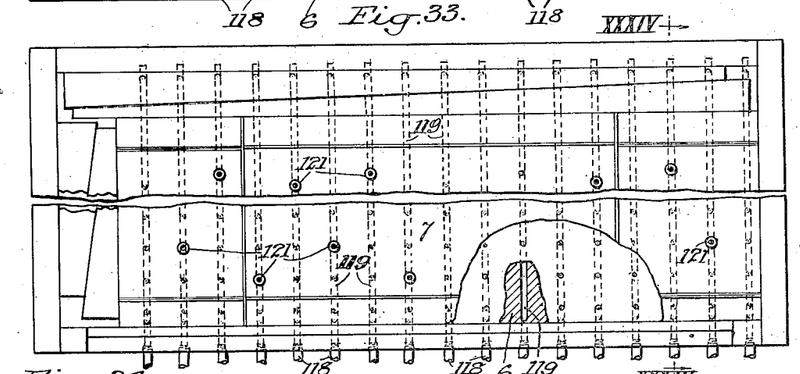
Fig. 33 represents a detail plan view of the same.
Figure 34:
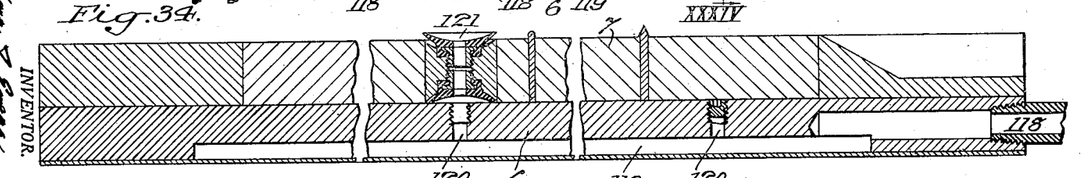
Fig. 34 represents a transverse section of the lower platen taken in the plane of the line XXXIV—XXXIV of Fig. 33 looking in the direction of the arrows and shown on a greatly enlarged scale.

The sheet handling carriage 46 (as it is raised and lowered with its track side rails 43) is shown as reciprocated on the track rails 43 by the following elements (see Figs. 16 and 17): a pair of rack bars 47 are slidably mounted in guides 48, which rack bars are provided with yokes 49 to receive studs or rollers 50 carried on the opposite sides of the carriage 46. These two rack bars 47 are reciprocated by two gears 51 fast on an oscillating cross shaft 52 (see Figs. 10, 11 and 12) which carries a gear 53 meshing with a gear 54 mounted on a stud shaft 55. A pinion 56 which is integral with the gear 54 meshes with a vertically disposed rack bar 57 mounted to slide in a bracket 58 carried by the press frame 3.

This rack bar 57 (see Figs. 9 and 10) is reciprocated by means of an arm 59 which is carried by one of the shafts 34.

The sheet handling carriage 46 (see Figs. 9 and 10) is retarded and accelerated during its reciprocating movements by the following elements: a two-part box cam 60, 61 is mounted to oscillate with the shaft 52 and arranged to receive a stud or roller 62 eccentrically carried by the gear 54. The shape and relative positions of the two parts 60 and 61 of this oscillating cam serve to control the rotary speed of the shaft 52 during its oscillations and hence the variable sliding movement of the rack bars 47 through the pair of gears 51 on the said shaft 52.

Figure 9:
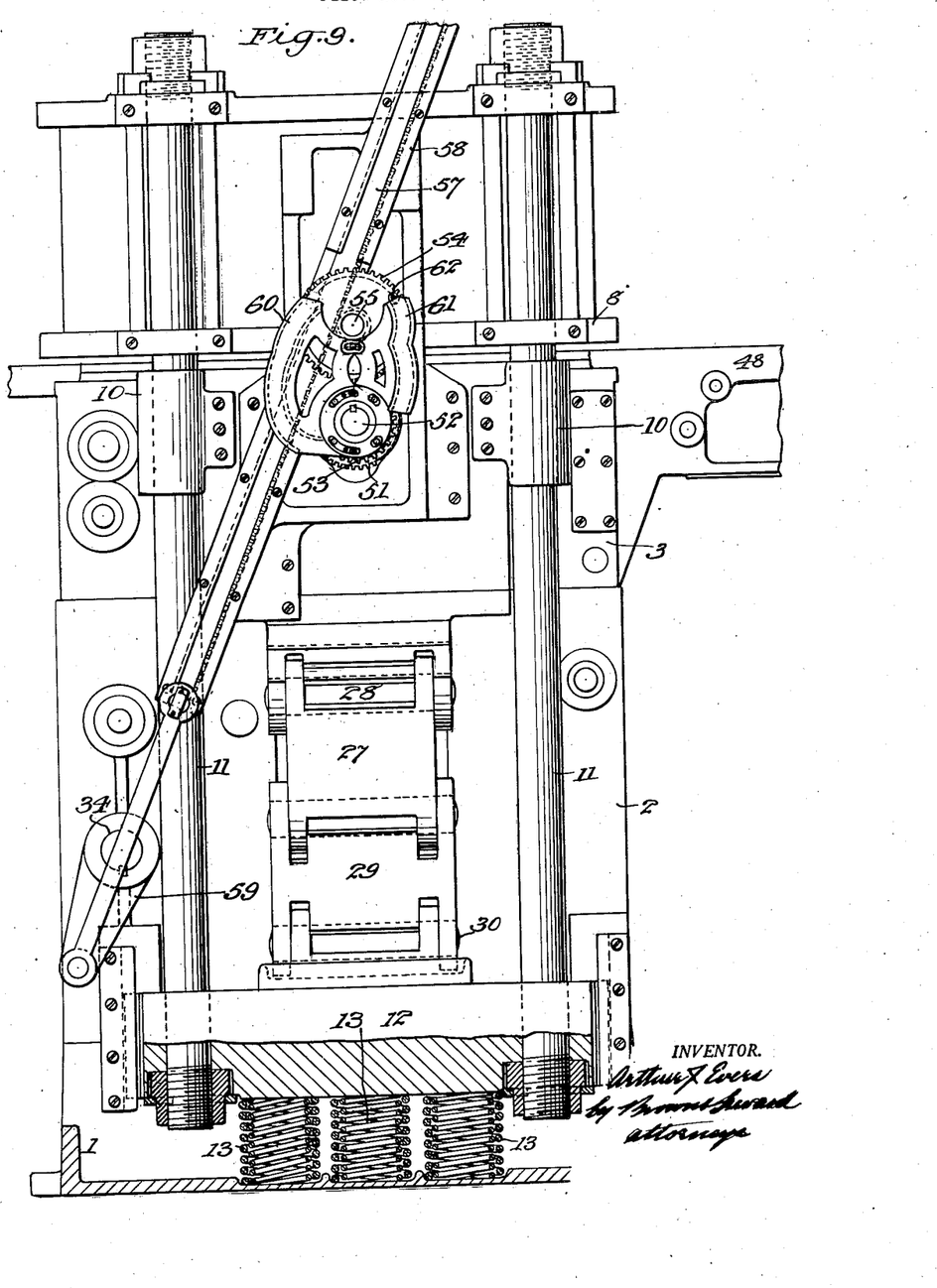
Fig. 9 represents a detail side elevation of the sheet handling carriage driving means and the reciprocating upper platen partly in section.
Figures 10, 11, 12:
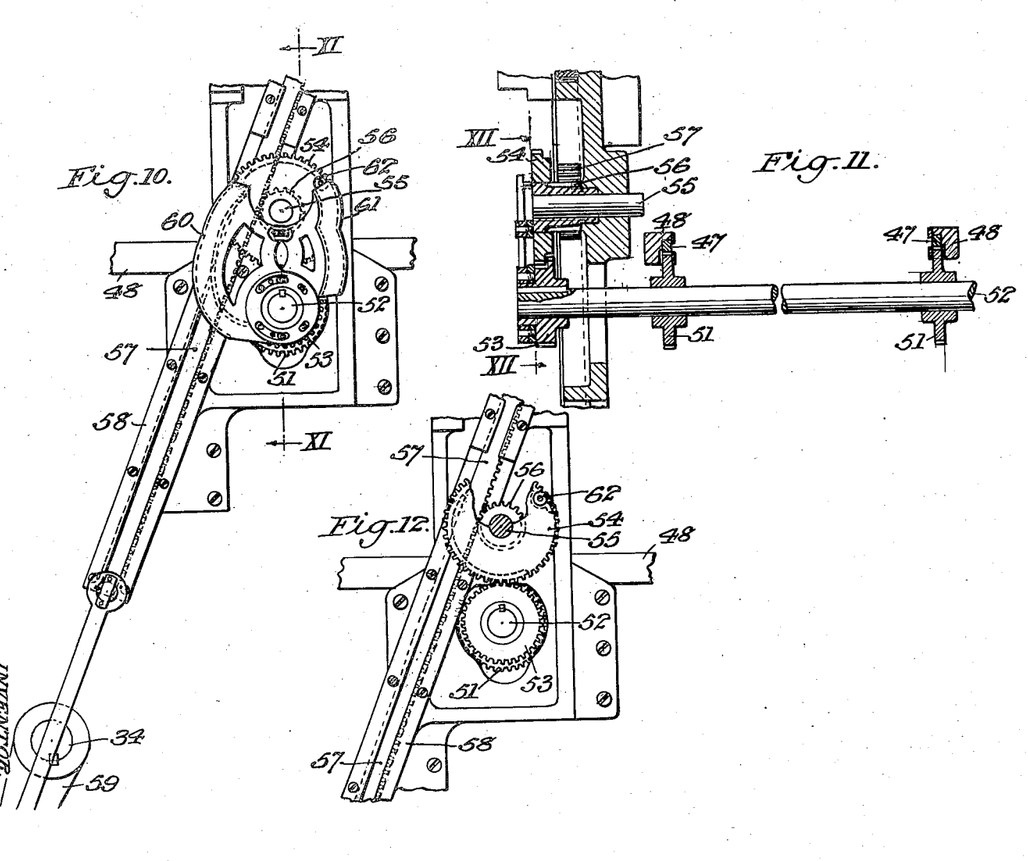
Fig. 10 represents a detail side elevation of the carriage driving means.
Fig. 11 represents a detail vertical section taken in the plane of the line XI—XI of Fig. 10, looking in the direction of the arrows.
Fig. 12 represents a detail vertical section taken in the plane of the line XII—XII of Fig. 11, looking in the direction of the arrows.

The throw of the arm 59 which is carried by the shaft 34 controls the length of the reciprocating movement of the rack bar 57 and thereby the number of rotations (in the present instance about two and one-half rotations) in each direction of the pinion 56 and the gear 54 which gear carries the stud or roller 62. The oscillating movement of the stud or roller 62 causes it to alternately enter the two parts 60, 61 of the box cam and thus cause the cam to oscillate the shaft 52 with a variable rotative speed in both directions. This oscillating movement of the shaft 52 will cause its gears 51 to reciprocate the two horizontally disposed rack bars 47 along their guides 48.

The means on the sheet handling carriage 46 for advancing a newly fed blank sheet into the press and simultaneously delivering a previously cut sheet out of the press, during one stroke of the carriage comprises sheet grippers and suction devices respectively.

The means on the sheet handling carriage 46 for advancing a newly fed blank sheet from the feed pile 4 into the press comprises the following elements: sheet grippers comprising fixed and movable jaws 63 and 64 are disposed across the rear end of the sheet handling carriage 46 in position to be closed to grasp a newly fed blank sheet from the pile 4 as the carriage reaches the end of its rearward or return stroke and to release the sheet as the carriage reaches the end of its forward or advance stroke.

The means for opening and closing these grippers 63, 64 comprises the following elements: (see Figs. 18 to 24) the lower movable jaws 64 of these grippers are connected by links 65 to spring pressed bars 66 slidable in the tube 67 which extend lengthwise of the carriage. The forward ends of these bars 66 are connected by links 68 to arms 69 fixed to a cross rock shaft 70 mounted at the forward end of the carriage. A cam operated lever 71 is also fixed to the rock shaft 70, one arm 72 of said lever carrying a stud or roller 73 and the other arm 74 carrying a stud or roller 75. Cams 76, 77 are carried by a lengthwise movable bar 78 slidable in hangers 79 depending from the track rail 43, which cams are located in position to engage their respective studs or rollers 73 and 75 to rock the lever 71 to close the grippers 63, 64 onto the newly fed sheet at the end of the return stroke of the carriage and to open the grippers at the end of the forward stroke of the carriage. Spring means 70* serves to yieldingly hold the gripper actuating shaft 70 in both of its positions.

One arm 80 of a rock lever pivoted on the cross shaft 81 is connected by a link 82 to the bar 78, the other arm 83 of which lever is connected by a link 84 to the uprising frame 85 of a rock lever pivoted at 86, the depending arm 87 of which lever is engaged by a box cam 88 fixed to the cross shaft 34.

Suction devices on the lower platen are provided for holding the newly fed sheets against displacement on the die 7 during the cutting and creasing operation. Suction devices are also provided on the sheet handling carriage for lifting the cut and creased sheet from the die and conveying it to a point over the delivery pile simultaneously with the feeding of a new sheet into the press; means being provided for controlling the operation of the suction devices at the proper times.

The suction pump 89 is driven by the electric motor 91 through the sprocket and chain connection 90. A pipe 92 leads from the pump to the upper manifold 93 carried by the uprights 94. This upper manifold 93 is shown as having eight ports 95 and four ports 95* through its upper wall which are brought into and out of communication with branch pipes 96 and 96* by bridge ports 97 and 97* in valves 98, 98* carried by a bar 99 operated at the proper times by a rock lever 100, 101 pivoted at 102 and connected by a link 103 to a rock lever 104, 105 pivoted at 106, which rock lever is connected by a link 107 to the uprising arm 108 of a rock lever pivoted at 109, the other arm 110 of which lever carries a stud or roller 111 engaged by a box cam 112 fixed to the shaft 34. The above mentioned branch pipes 96* are connected through pipes 113, 114 to a lower manifold 115. This lower manifold is provided with vertical branches 116 which are connected by flexible tubes 117 and elbows 118 to horizontal passages 119 in the lower platen 6. Ports 120 in the lower platen lead to suction devices 121 in the die 7.

The branch pipes 96 are connected through pipes 122 and elbows 123 to spaced horizontal pipes 124 extending lengthwise of the carriage 46. The bottom walls of these pipes 124 are in open communication at all times with the suction devices 125.

The cutter plate 9 is herein shown as secured by bolts 126 and keepers 127 to the upper platen 8. To prevent the buckling of the cutter plate suction may be exerted thereon at all times through a pipe 128 leading from the main exhaust pipe 92 to a suction chamber 129 in the lower face of the upper platen 8.

In operation: any well known or approved sheet feeding mechanism, not shown herein, may be employed for bringing the blank sheets from the pile 4 into proper end and side register to be grasped by the grippers 63, 64 on the rear end of the sheet handling carriage 46 at the limit of its rearward or return stroke.

As the carriage is about to start on its variable speed forward stroke its grippers 63, 64 are closed by the cam 88 on the cam shaft 34 which is driven from the motor 14, thus causing the grippers to grasp the leading end of the newly fed sheet. The previously cut and creased sheet on the die is released by its suction devices 121 on the die and engaged by the previously cut and creased sheet delivery suction devices 125 on the carriage. As the carriage starts on its forward stroke it is raised by the lifting of its track by the related movements of the cam shaft 34, box cam 35, rock lever 36, 38, link 39, arm 40 of rock shaft 41, arms 42, 44 and 45 and side rails 43 of the track. This operation will cause the grippers 63, 64 on the rear end of the carriage to lift the advance end of the newly fed sheet at the same time that the suction devices 125 on the carriage lift the previously cut and creased sheet away from its die. The further forward movement of the carriage will cause the grippers 63, 64 to move the newly fed sheet into the press and at the same time cause the suction devices 125 on the carriage to move the previously cut and creased sheet out of the press. As the carriage approaches the end of its forward movement it will be lowered by the lowering of the track to bring the newly fed sheet into its proper position on the die and the previously cut and creased sheet to its position over the delivery pile 5. The suction devices 121 on the die will then be operated to hold the newly presented sheet in position on the die.

The upper platen 8 at this time has been moved downwardly into position to cause the die and cutter plate to coact on the newly fed sheet to cut and crease the same, it being understood that the movement of the carriage is stopped at this time.

As it has been previously explained, the variable speed reciprocating movement of the carriage is accomplished by the related movements of the shaft 18, gears 32, 33, shaft 34, crank arm 59, rack bar 57, its pinion 56, gear 54, stud or roller 62, two part oscillating box cam 60, 61, gear 53 on oscillating shaft 52, gears 51 and horizontally disposed rack bars 47.

The grippers 63, 64 on the carriage will be opened and retracted after the carriage has moved forwardly to complete its stroke thereby bringing the grippers beyond the advance edge of the newly fed sheet. The suction devices 125 on the carriage will then be released to permit the previously cut and creased sheet to be delivered onto the pile 5.

As the upper platen and the carriage start on their respective return strokes the suction devices 121 on the die will still hold the newly fed cut and creased sheet on the die. The grippers 63, 64 on the rear end of the carriage will at the same time be raised above the said sheet by the raising of the track on which the carriage reciprocates. The carriage then proceeds in its raised position on its return stroke between the upper and lower platens. As the carriage nears the limit of its return stroke it is lowered by the lowering of the track. This lowering movement of the carriage will bring its suction devices into contact with the newly cut and creasing sheet and its grippers in position to grasp the leading end of the next sheet advanced from the pile 4. Suction is now "off" of the suction devices 121 on the die and "on" the suction devices 123 of the carriage. It will be noted that the suction is applied to the devices 121 on the die in advance of the upper platen touching the new sheet to be cut and creased and that it remains on until the carriage is directly over the sheet and ready to go down on the sheet for the removal of the same, at which time suction is started on the devices 123 of the carriage and cut off from the suction devices 121 in the die.

Figures 1, 2, 3:
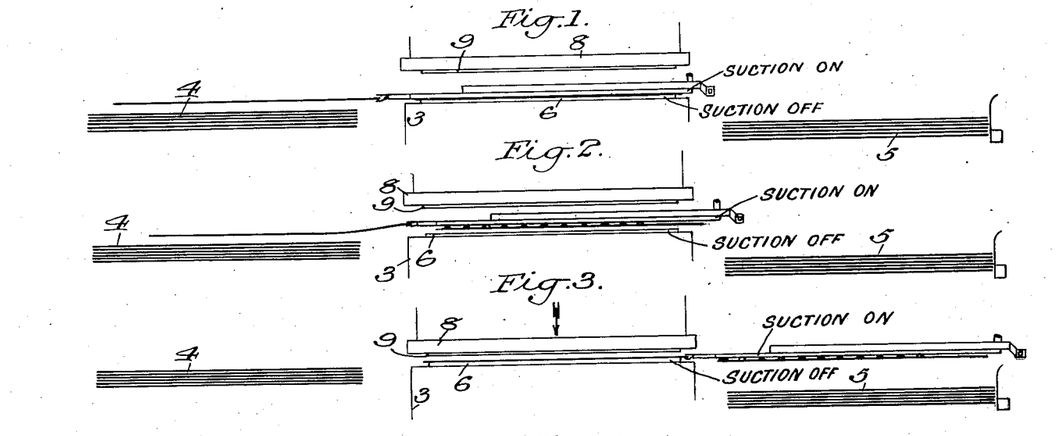
Figs. 1 to 5 inclusive represent, diagrammatically, the several stages through which the sheets pass from the blanks to the finished or cut and creased products.
Figure 4:
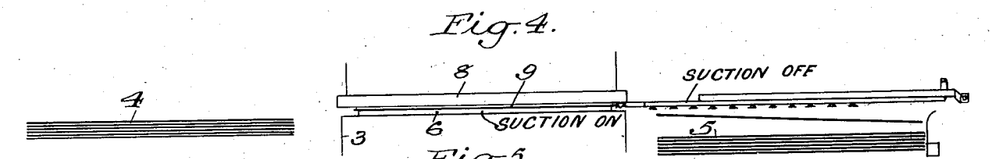
Figure 5:
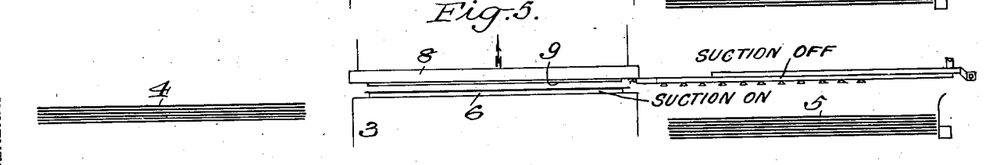
Figure 6:
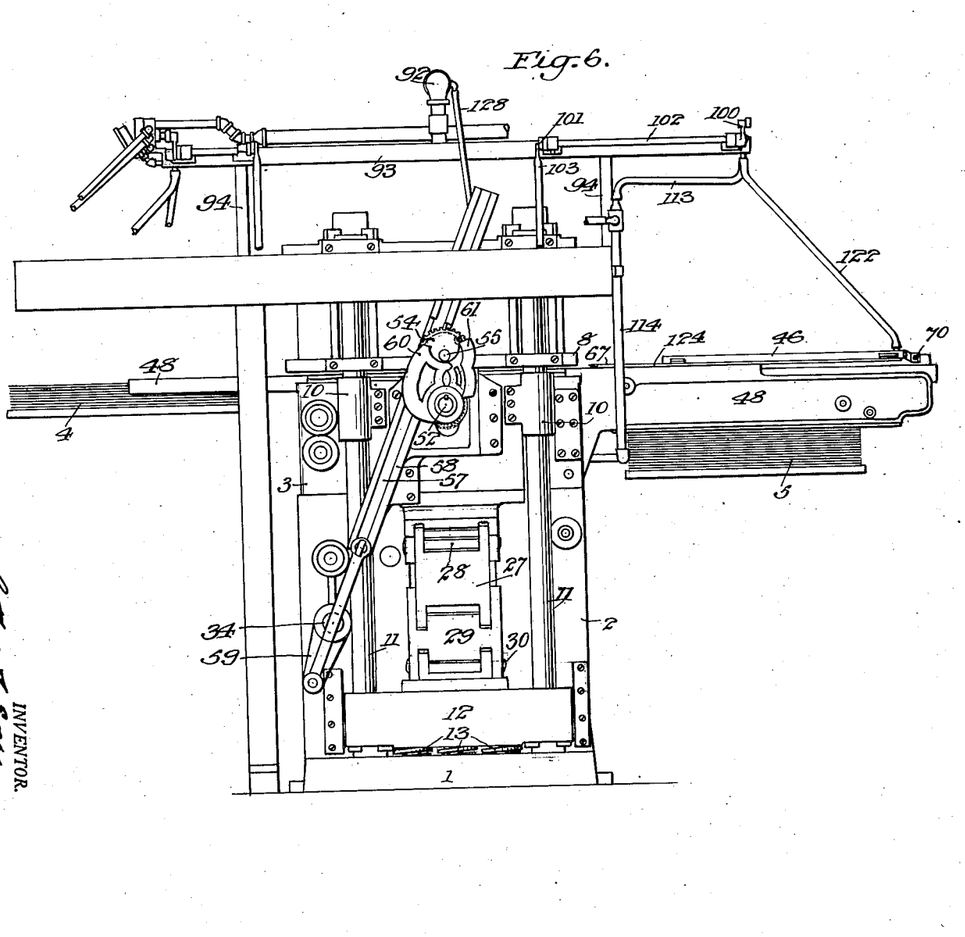
Fig. 6 represents a side elevation of so much of the machine that includes the invention.

It will be understood that the suction devices on the die and carriage are alternately operated from the box cam 112 on the shaft 34 through the rock lever 108, 110, link 107, rock lever 104, 105, link 103, rock lever 100, 101, bar 99, connected manifolds 93, 95, pipe 92 and suction pump 89. In Figs. 1, 2 and 3 the suction devices on the carriage will be "on" and the suction devices on the die will be "off." In Figs. 4 and 5 the suction devices on the carriage will be "off" and the suction devices on the die will be "on."

It will also be understood, from the above description and the drawings, that the platen operating mechanism, the carriage raising and lowering mechanism, the gripper operating mechanism and the mechanisms for controlling the operation of the suction devices carried by the lower platen and by the reciprocating carriage respectively, are all arranged and coordinated to be operated relatively to one another for producing the results stated.

The method of cutting and creasing successive sheets by the repeated coaction of a die and its cutter plate, shown and described but not claimed herein forms the subject matter of my copending application filed December 21, 1945, its Serial No. being 636,338.

It is evident that various changes may be resorted to in the construction, form and arrangement of the several parts without departing from the spirit and scope of my invention, and hence I do not intend to be limited to the particular embodiment herein shown and described, but what I claim is:

1. In a sheet cutting and creasing press, a die and its coacting plate, a reciprocating carriage, sheet grippers on the carriage operable during one stroke of the carriage to feed a new sheet into the press, and suction devices on the carriage operable during the same stroke to deliver the preceding cut and creased sheet from the press.

2. In a sheet cutting and creasing press, a die and its coacting plate, a reciprocating carriage, sheet grippers on the carriage operable during one stroke of the carriage to feed a new sheet into the press, suction devices on the carriage operable during the same stroke to deliver the preceding cut and creased sheet from the press, and means for holding the sheet on the die during the cutting and creasing operation.

3. In a sheet cutting and creasing press, a die and its coacting plate, a reciprocating carriage, sheet grippers on the carriage operable during one stroke of the carriage to feed a new sheet into the press, suction devices on the carriage operable during the same stroke to deliver the preceding cut and creased sheet from the press, and suction means for holding the sheet on the die during the cutting and creasing operation.

4. In a sheet cutting and creasing press, a die and its coacting plate, a reciprocating carriage, sheet grippers at the rear end of the carriage for feeding a new sheet into the press during the forward stroke of the carriage, suction devices on the carriage operable during the same stroke for delivering the preceding cut and creased sheet from the press, and means for raising and lowering the carriage as it reciprocates.

5. In a sheet cutting and creasing press, a die and its coacting plate, a reciprocating carriage, sheet grippers at the rear end of the carriage for feeding a new sheet into the press during the forward stroke of the carriage, suction devices on the carriage operable during the same stroke for delivering the preceding cut and creased sheet from the press, means for raising and lowering the carriage as it reciprocates, and means for holding the sheet on the die during the cutting and creasing operation.

6. In a sheet cutting and creasing press, a die and its coacting plate, a reciprocating carriage, sheet grippers at the rear end of the carriage for feeding a new sheet into the press during the forward stroke of the carriage, suction devices on the carriage operable during the same stroke for delivering the preceding cut and creased sheet from the press, means for raising and lowering the carriage as it reciprocates, and suction means for holding the sheet on the die during the cutting and creasing operation.

7. In a sheet cutting and creasing press, a die and its coacting plate, a reciprocating carriage, means for raising and lowering the carriage as it reciprocates, means on the carriage operable during the forward stroke thereof to feed a new sheet forward and lower it on the die, and means on the carriage operable during the same stroke to lift the preceding cut and creased sheet from the die, convey the sheet forward and lower it to a delivery point.

8. In a sheet cutting and creasing press, a die and its coacting plate, a reciprocating carriage, means for raising and lowering the carriage as it reciprocates, means on the carriage operable during the forward stroke thereof to feed a new sheet forward and lower it on the die, means on the carriage operable during the same stroke to lift the preceding cut and creased sheet from the die, convey the sheet forward and lower it to a delivery point, and means for holding the sheet on the die during the cutting and creasing operation.

9. In a sheet cutting and creasing press, a die and its coacting plate, a reciprocating carriage, means for raising and lowering the carriage as it reciprocates, means on the carriage operable during the forward stroke thereof to feed a new sheet forward and lower it on the die, means on the carriage operable during the same stroke to lift the preceding cut and creased sheet from the die, convey the sheet forward and lower it to a delivery point, and suction means for holding the sheet on the die during the cutting and creasing operation.

10. In a sheet cutting and creasing press, a die and its coacting plate, a reciprocating carriage, means for raising and lowering the carriage as it reciprocates, grippers at the rear end of the carriage operable during the forward stroke of the carriage to feed a new sheet forward and lower it on the die, and suction devices on the carriage operable during the same stroke to lift the preceding cut and creased sheet from the die, convey the sheet forward and lower it to a delivery point.

11. In a sheet cutting and creasing press, a die and its coacting plate, a reciprocating carriage, means for raising and lowering the carriage as it reciprocates, grippers at the rear end of the carriage operable during the forward stroke of the carriage to feed a new sheet forward and lower it on the die, suction devices on the carriage operable during the same stroke to lift the preceding cut and creased sheet from the die, convey the sheet forward and lower it to a delivery point, and suction devices disposed along the die for holding the sheet thereon during the cutting and creasing operation.

12. In a sheet cutting and creasing press, a die and its coacting plate, a reciprocating carriage, means for raising and lowering the carriage as it reciprocates, grippers at the rear end of the carriage operable during the forward stroke of the carriage to feed a new sheet forward and lower it on the die, suction devices on the carriage operable during the same stroke to lift the preceding cut and creased sheet from the die, convey the sheet forward and lower it to a delivery point, suction devices disposed along the die for holding the sheet thereon during the cutting and creasing operation, and means for thereafter opening and retracting the grippers.

13. In a sheet cutting and creasing press, a die and its coacting plate, a track, means for raising and lowering it, a carriage, means thereon operable during one stroke to feed a new sheet and deliver the preceding cut and creased sheet, means for reciprocating the carriage on the track, and means for momentarily stopping the carriage at one end of the stroke.

14. In a sheet cutting and creasing press, a die and its coacting plate, a track, means for raising and lowering it, a carriage, means thereon operable during one stroke to feed a new sheet and deliver the preceding cut and creased sheet, means for reciprocating the carriage on the track, and means for momentarily stopping the carriage at both ends of its stroke.

15. In a sheet cutting and creasing press, a die and its coacting plate, a reciprocating carriage, grippers thereon for feeding a sheet to the die during one stroke, and means for momentarily stopping the carriage at the delivery end of its stroke as the sheet is cut and creased and thereafter retracting the grippers on the carriage.

16. In a sheet cutting and creasing press, a die and its coacting plate, a track, means for raising and lowering it, a carriage, grippers thereon for feeding the sheets to the die during one stroke, means for reciprocating the carriage on the track, and means for momentarily stopping the carriage at the delivery end of its stroke as the sheet is cut and creased and thereafter retracting the grippers on the carriage.

17. In a sheet cutting and creasing press, a die and its coacting plate, a track, means for raising and lowering it, a rack, means for reciprocating it, and a sheet handling carriage slidably mounted on the track and having a vertically movable driving connection with the rack.

18. In a sheet cutting and creasing press, a die and its coacting plate, a track, rock levers supporting it, means for rocking said levers to raise and lower the track, a rack, means for reciprocating it, and a sheet handling carriage slidably mounted on the track and having a vertically movable driving connection with the rack.

19. In a sheet cutting and creasing press, coacting upper and lower platens, their respective die and cutter plate, a sheet handling carriage reciprocating between them, and suction means acting on the cutter plate to hold it to its platen against buckling thereon.

ARTHUR J. EVERS.